US010756862B2

(12) United States Patent
Kim et al.

(10) Patent No.: US 10,756,862 B2
(45) Date of Patent: Aug. 25, 2020

(54) METHOD AND DEVICE FOR CONTROLLING TRANSMISSION OF SOUNDING REFERENCE SIGNAL IN WIRELESS ACCESS SYSTEM SUPPORTING MACHINE TYPE COMMUNICATION

(71) Applicant: LG Electronics Inc., Seoul (KR)

(72) Inventors: Bonghoe Kim, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/564,484

(22) PCT Filed: Apr. 8, 2016

(86) PCT No.: PCT/KR2016/003709
§ 371 (c)(1),
(2) Date: Oct. 5, 2017

(87) PCT Pub. No.: WO2016/163805
PCT Pub. Date: Oct. 13, 2016

(65) Prior Publication Data
US 2018/0083752 A1 Mar. 22, 2018

Related U.S. Application Data

(60) Provisional application No. 62/145,529, filed on Apr. 10, 2015.

(51) Int. Cl.
*H04L 5/00* (2006.01)
*H04L 1/18* (2006.01)
(Continued)

(52) U.S. Cl.
CPC ............ *H04L 5/0048* (2013.01); *H04L 1/18* (2013.01); *H04L 5/001* (2013.01); *H04L 29/08* (2013.01);
(Continued)

(58) Field of Classification Search
CPC ......... H04L 5/0048; H04L 1/18; H04L 29/08; H04L 5/00; H04W 72/1268; H04W 72/0453; H04W 4/70
See application file for complete search history.

(56) References Cited

U.S. PATENT DOCUMENTS 8,817,719 B2 * 8/2014 Behravan ................ H04L 5/005
370/329
8,849,292 B2 * 9/2014 Tiirola .................. H04L 5/0048
370/329
(Continued)

FOREIGN PATENT DOCUMENTS

CN   104380820 A    2/2015
EP   3236610 A1   10/2017
(Continued)

OTHER PUBLICATIONS

R1-150517: 3GPP TSF RAN WG1 Meeting #80, Athens, Greece, Feb. 9-13, 2015, ETRI, "Link performance of uplink data transmission for MTC," pp. 1-3.
(Continued)

*Primary Examiner* — Brian T O Connor
(74) *Attorney, Agent, or Firm* — Dentons US LLP

(57) ABSTRACT

The present invention provides methods for controlling transmission of a sounding reference signal (SRS) in a wireless access system supporting machine type communication (MTC) and devices for supporting same. A method for controlling transmission of an SRS by an MTC terminal in a wireless access system supporting MTC, according to an embodiment of the present invention, can comprise the steps of: receiving an upper layer signal comprising information about an SRS which is to be repeatedly transmitted; configuring the SRS on the basis of the information about the SRS; and transmitting the SRS by means of a subband to which a physical uplink shared channel (PUSCH) is allo-
(Continued)

cated and which is being frequency hopped. The subband comprises six physical resource blocks (PRB), and the SRS can be sequentially transmitted to the subband being frequency hopped.

10 Claims, 14 Drawing Sheets

(51) Int. Cl.
*H04L 29/08* (2006.01)
*H04W 4/70* (2018.01)
*H04W 72/04* (2009.01)
*H04W 72/12* (2009.01)

(52) U.S. Cl.
CPC ......... *H04W 4/70* (2018.02); *H04W 72/0453* (2013.01); *H04W 72/1268* (2013.01); *H04L 5/005* (2013.01); *H04L 5/0051* (2013.01)

(56) References Cited

U.S. PATENT DOCUMENTS

| | | | | |
|---|---|---|---|---|
| 9,144,065 | B2* | 9/2015 | Papasakellariou | H04W 72/042 |
| 9,420,584 | B2* | 8/2016 | Blankenship | H04W 4/70 |
| 9,769,772 | B2* | 9/2017 | Dinan | H04W 52/146 |
| 9,813,208 | B2* | 11/2017 | Kim | H04B 7/024 |
| 9,967,079 | B2* | 5/2018 | Noh | H04W 52/04 |
| 10,171,276 | B2* | 1/2019 | Stern-Berkowitz | H04L 5/0048 |
| 10,243,720 | B2* | 3/2019 | Lee | H04L 5/0066 |
| 2012/0106471 | A1* | 5/2012 | Behravan | H04L 5/005 370/329 |
| 2013/0083753 | A1 | 4/2013 | Lee et al. | |
| 2013/0135984 | A1 | 5/2013 | Choi et al. | |
| 2014/0105141 | A1 | 4/2014 | Noh et al. | |
| 2014/0313908 | A1 | 10/2014 | da Silva et al. | |
| 2014/0376482 | A1* | 12/2014 | Kim | H04B 7/024 370/329 |
| 2015/0016377 | A1 | 1/2015 | Kim et al. | |
| 2016/0095137 | A1* | 3/2016 | Chen | H04L 5/0007 370/329 |
| 2016/0205632 | A1* | 7/2016 | Yi | H04W 52/146 455/522 |
| 2016/0234858 | A1* | 8/2016 | Bao | H04W 72/12 |
| 2016/0338048 | A1* | 11/2016 | Aiba | H04W 72/00 |
| 2017/0048039 | A1* | 2/2017 | Zhao | H04L 5/0048 |
| 2017/0126379 | A1* | 5/2017 | Choi | H04L 1/00 |
| 2017/0238268 | A1* | 8/2017 | Yang | H04L 5/00 370/329 |
| 2017/0238287 | A1* | 8/2017 | Kusashima | H04W 28/04 370/280 |
| 2017/0279505 | A1* | 9/2017 | Zhang | H04B 7/26 |
| 2017/0280454 | A1* | 9/2017 | Kusashima | H04J 3/00 |
| 2017/0374675 | A1* | 12/2017 | Hwang | H04W 72/04 |
| 2018/0054824 | A1* | 2/2018 | Xue | H04L 5/001 |
| 2018/0191474 | A1* | 7/2018 | Sun | H04W 72/0453 |
| 2019/0158263 | A1* | 5/2019 | Lee | H04L 5/0066 |
| 2019/0190763 | A1* | 6/2019 | Takeda | H04L 5/0053 |
| 2019/0215110 | A1* | 7/2019 | Yang | H04L 5/00 |

FOREIGN PATENT DOCUMENTS

| | | |
|---|---|---|
| EP | 3297378 A1 | 3/2018 |
| JP | 2012529836 A | 11/2012 |
| JP | 2013520091 A | 5/2013 |
| JP | 6393764 B2 | 9/2018 |
| JP | 6563514 | 8/2019 |
| WO | 2013173673 A2 | 11/2013 |
| WO | 2016122782 A1 | 8/2016 |

OTHER PUBLICATIONS

R1-150202: 3GPP TSG RAN WG1 Meeting #80, Athens, Greece, Feb. 9-13, 2015, LG Electronics, "PUCCH/PUSCH transmission for MTC UEs," pp. 1-9.
LG Electronics, "Details on SR, SRS and SPS transmission for MTC UE,"3GPP TSG RAN WG1 Meeting #83, Nov. 15-22, 2015, R1-156848.
Huawei, HiSilicon, "Coverage analysis on (E)PDCCH and PUCCH for low-cost MTC UEs," 3GPP TSG RAN WGI Meeting #72b, Apr. 15-19, 2013, R1-130889.
ZTE, "Considerations on physical data channels for MTC enhancement," 3GPP TSG RAN WG1 Meeting #80, Feb. 9-13, 2015, R1-150143.
LG Electronics, "Details on SR repetition and SRS transmission for MTC UE," 3GPP TSG RAN WG1 Meeting #82, Aug. 24-28, 2015, R1-154239.
"3rd Generation Partnership Project; Technical Specification Group Radio Access Network; Evolved Universal Terrestrial Radio Access (E-UTRA); Physical Channels and Modulation (Release 9)," 3GPP TS 36.211 V9.1.0, Mar. 21, 2010, XP051296785.
"3rd Generation Partnership Project; Technical Specification Group Radio Access Network; Evolved Universal Terrestrial Radio Access (E-UTRA); Physical layer procedures (Release 12)," 3GPP TS 36.213 V12.5.0, Mar. 26, 2015.
Huawei, "Dynamic aperiodic UL sounding design", 3GPP TSG RAN WG1 Meeting #60bis, Apr. 12-16, 2010, R1-101971.
"3rd Generation Partnership Project; Technical Specification Group Radio Access Network; Evolved Universal Terrestrial Radio Access (E-UTRA); Physical channels and modulations (Release 11)", 3GPP TS 36.211 V11.4.0 (Sep. 2013).
LG Electronics, "Details on SR repetition and SRS transmission for MTC UE," 3GPP TSG RAN WG1 Meeting #82bis, R1-155371, Malmö, Sweden, Oct. 5-9, 2015.
Ericsson, "NB-IoT—Remaining issues for NPUSCH design," 3GPP TSG RAN WG1 Meeting #84bis, R1-162776 Busan, Korea, Apr. 11-15, 2016.

\* cited by examiner

FIG. 11
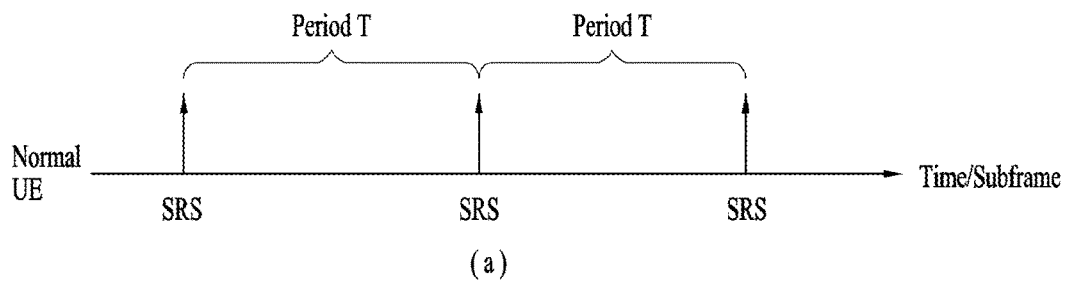
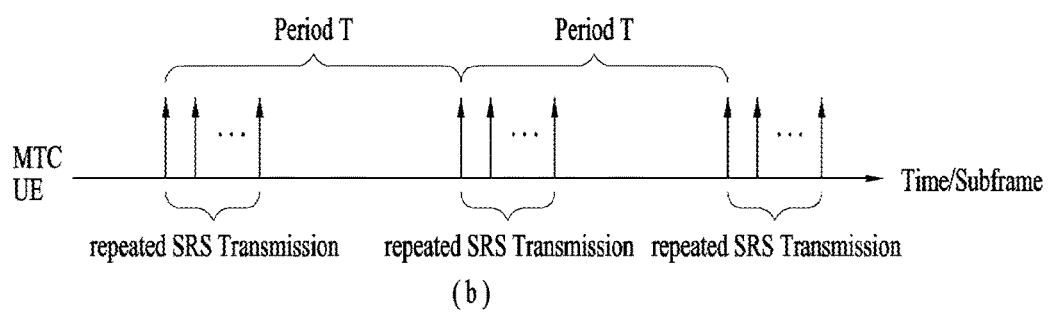
FIG. 12
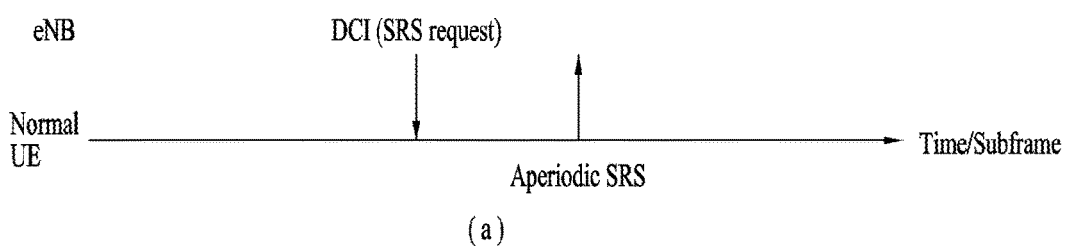
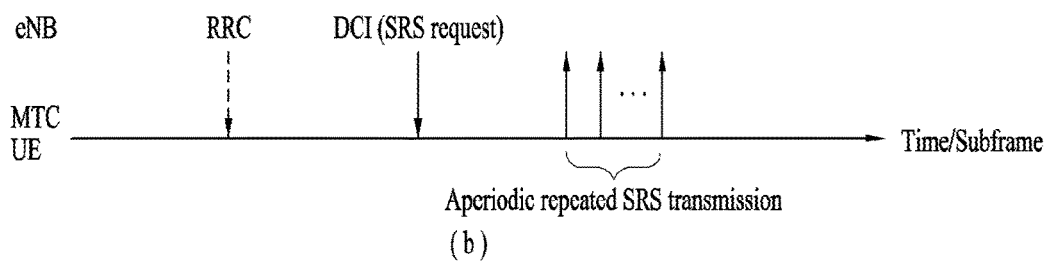

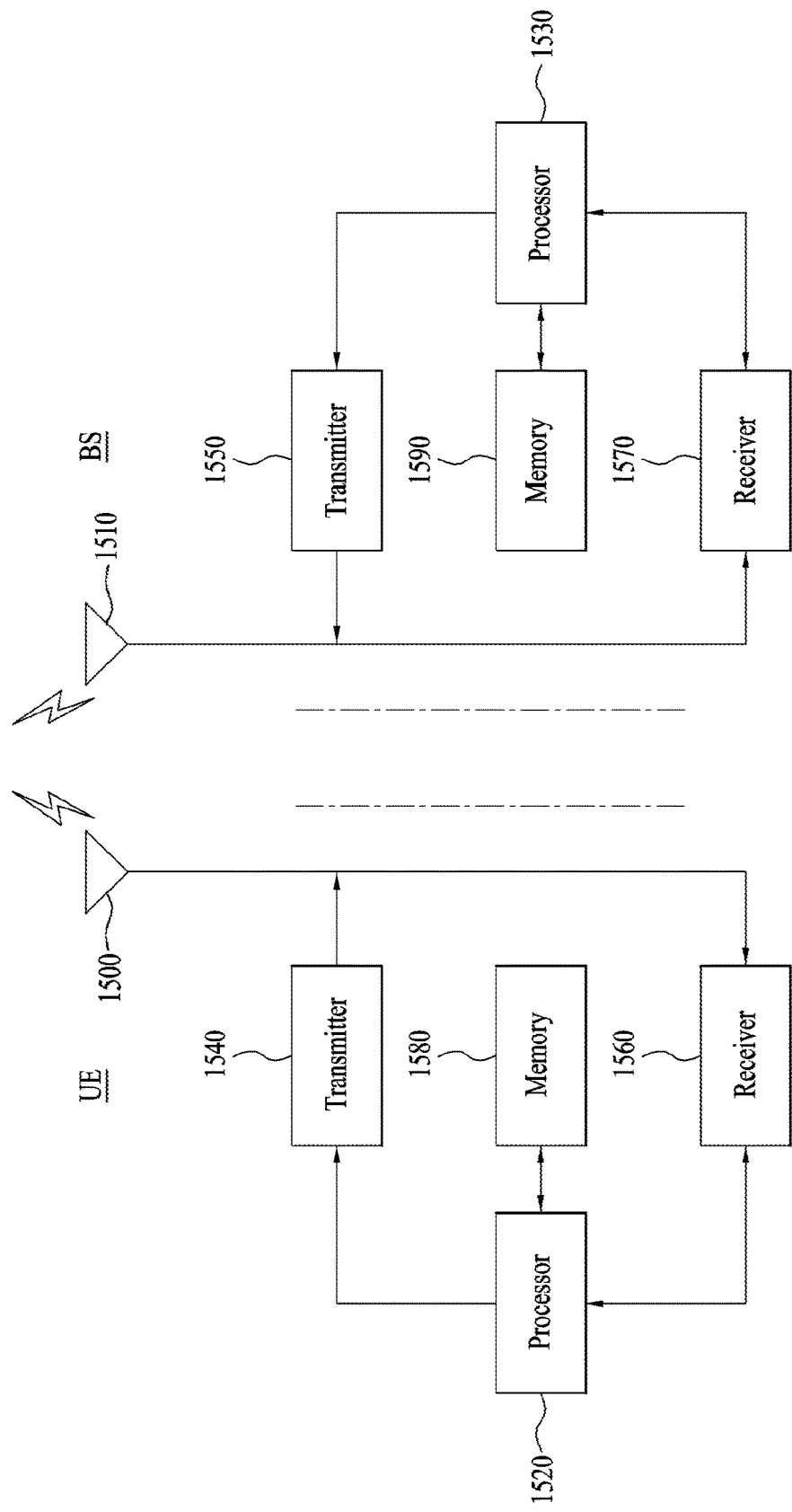

METHOD AND DEVICE FOR CONTROLLING TRANSMISSION OF SOUNDING REFERENCE SIGNAL IN WIRELESS ACCESS SYSTEM SUPPORTING MACHINE TYPE COMMUNICATION

This application is a National Stage Entry of International Application No. PCT/KR2016/003709, filed Apr. 8, 2016, and claims the benefit of U.S. Provisional Application No. 62/145,529, filed on Apr. 10, 2015, which are hereby incorporated by reference for all purposes as if fully set forth herein.

TECHNICAL FIELD

The present disclosure relates to a wireless access system supporting Machine Type Communication (MTC), and more particularly, to a method for transmitting a Sounding Reference Signal (SRS) by an MTC User Equipment (UE), a method for controlling SRS transmission during uplink data transmission, and apparatuses supporting the methods.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An aspect of the present disclosure is to provide a method and apparatus for transmitting a Sounding Reference Signal (SRS) in a wireless communication environment supporting Machine Type Communication (MTC).

Another aspect of the present disclosure is to provide a method for configuring an SRS to repeatedly transmit the SRS, and a method for transmitting an SRS in an MTC environment.

Another aspect of the present disclosure is to provide a method for transmitting an SRS and uplink data, for frequency retuning, in the case where an SRS transmission subband is not identical to an uplink data transmission subband in an MTC environment.

Another aspect of the present disclosure is to provide a method for transmitting an SRS and uplink data, in the case where an SRS transmission subband is not identical to an uplink data transmission subband in an MTC environment.

Another aspect of the present disclosure is to provide apparatuses supporting the above methods.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides methods for controlling Sounding Reference Signal (SRS) transmission in a wireless access system supporting Machine Type Communication (MTC), and apparatuses supporting the same.

In an aspect of the present disclosure, a method for controlling SRS transmission by an MTC User Equipment (UE) in a wireless access system supporting MTC may include receiving a higher-layer signal including information about an SRS to be transmitted repeatedly, configuring the SRS based on the information about the SRS, and transmitting the SRS in a frequency-hopped subband to which a Physical Uplink Shared Channel (PUSHC) is allocated. The subband may include six Physical Resource Blocks (PRBs), and the SRS may be transmitted sequentially in the frequency-hopped subband.

In another aspect of the present disclosure, an MTC UE for controlling SRS transmission in a wireless access system supporting MTC may include a transmitter, a receiver, and a processor for controlling the SRS transmission. The processor may be configured to receive a higher-layer signal including information about an SRS to be transmitted repeatedly by controlling the receiver, to configure the SRS based on the information about the SRS, and to transmit the SRS in a frequency-hopped subband to which a Physical Uplink Shared Channel (PUSCH) is allocated by controlling the transmitter. The subband may include six PRBs, and the SRS may be transmitted sequentially in the frequency-hopped subband.

The higher-layer signal may further include subband information indicating a subband in which the SRS is to be transmitted.

The SRS may be transmitted sequentially in units of one PRB.

The SRS may be repeatedly transmitted a predetermined number of times in the subband.

The SRS may be transmitted periodically or upon request of a base station.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

First, as a Base Station (BS) receives a repeatedly transmitted Sounding Reference Signal (SRS), the BS may more reliably estimate an uplink channel from a Machine Type Communication (MTC) User Equipment (UE) located in a poor environment.

Secondly, an uplink channel from an MTC UE may be efficiently used by an SRS generation method and an SRS transmission method which are designed for repeated SRS transmissions unique to the MTC UE.

Thirdly, since an MTC UE drops an SRS transmission and transmits only a Physical Uplink Shared Channel (PUSCH), for frequency retuning that may occur in the case of a mismatch between an SRS transmission subband and a PUSCH transmission subband, data throughput loss may be reduced.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 11 is a view illustrating one of methods for repeatedly transmitting an SRS by a Machine Type Communication (MTC) User Equipment (UE), in the case of trigger type 0 as an SRS transmission scheme;

FIG. 12 is a view illustrating one of methods for repeatedly transmitting an SRS by an MTC UE, in the case of trigger type 1 as an SRS transmission scheme;

FIG. 15 is a block diagram of apparatuses for implementing the methods described with reference to FIGS. 1 to 14.

BEST MODE FOR CARRYING OUT THE INVENTION

Figure 1:
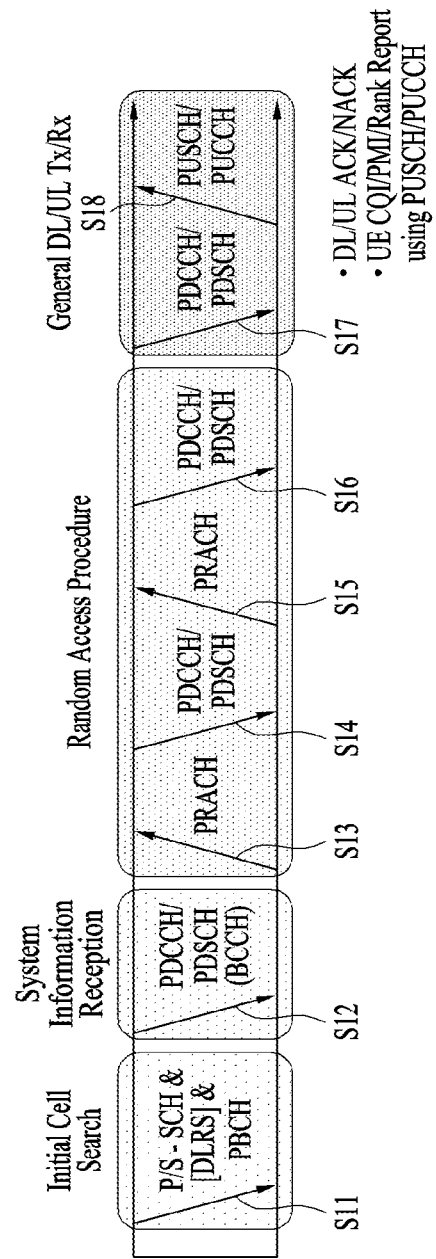
FIG. 1 is a view illustrating physical channels and a signal transmission method using the physical channels.

Embodiments of the present disclosure as described below in detail relate to methods for transmitting a Sounding Reference Signal (SRS) in a wireless access system supporting Machine Type Communication (MTC), and apparatuses supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a data block is interchangeable with a transport block in the same meaning. In addition, the MCS/TBS index table used in the LTE/LTE-A system can be defined as a first table or a legacy table, and the MCS/TBS index table which is used for supporting the 256QAM can be defined as a second table or a new table.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/INACK), a Scheduling Request (SR), a Channel Quality Indicator (CQI), a Precoding Matrix Index (PMI), a Rank Indicator (RI), etc.

In the LTE system. UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
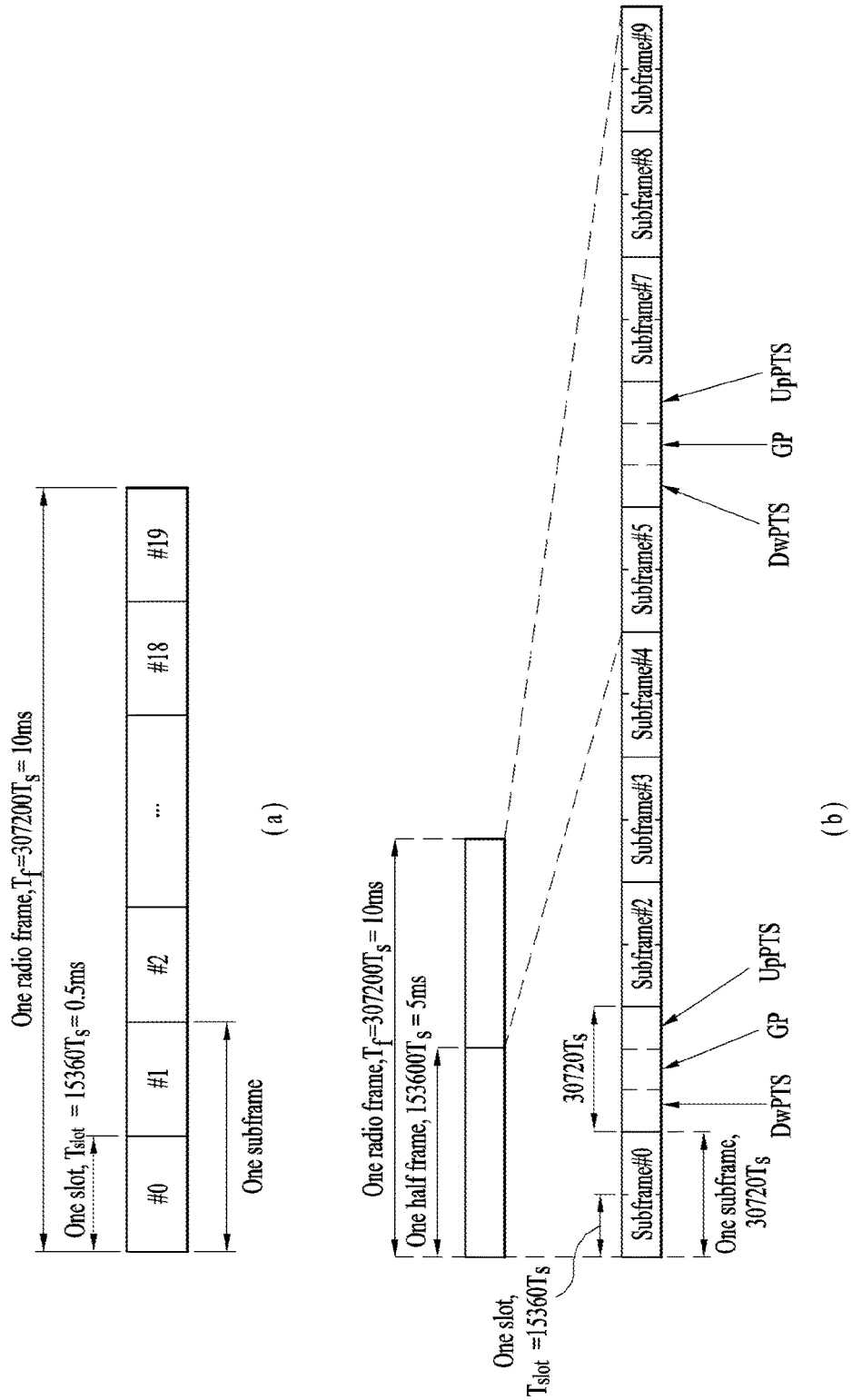
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s=1/(15 \text{ kHz} \times 2048)=3.2552 \times 0^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f$=307200·$T_s$) long, including two half-frames each having a length of 5 ms (=153600·$T_s$) long. Each half-frame includes five subframes each being 1 ms (=30720·$T_s$) long. An $i^{th}$ subframe includes $2i^{th}$ and $(2i+1)^{th}$ slots each having a length of 0.5 ms ($T_{slot}$=15360·$T_s$). $T_s$ is a sampling time given as $T_s$=1/(15 kHz×2048)=3.2552×0$^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

RBs in a subframe are allocated to a PUCCH for a UE. The RBs of the RB pair occupy different subcarriers in two slots. Thus it is said that the RB pair frequency-hops over a slot boundary.

Figure 5:
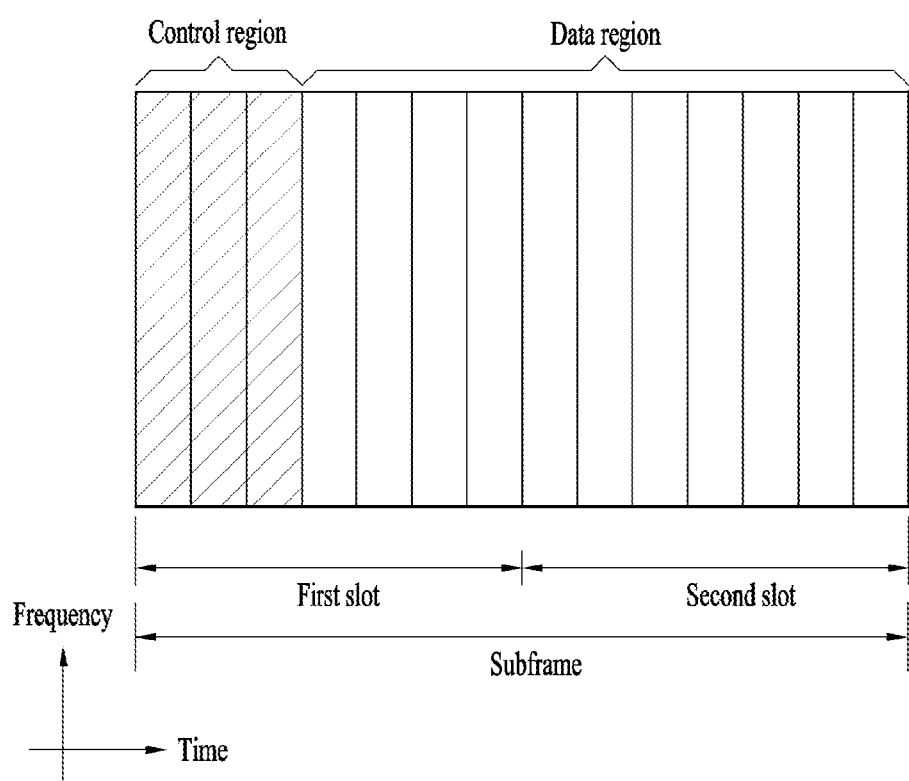
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| | | Normal cyclic prefix in downlink | | | Extended cyclic prefix in downlink | |
|---|---|---|---|---|---|---|
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
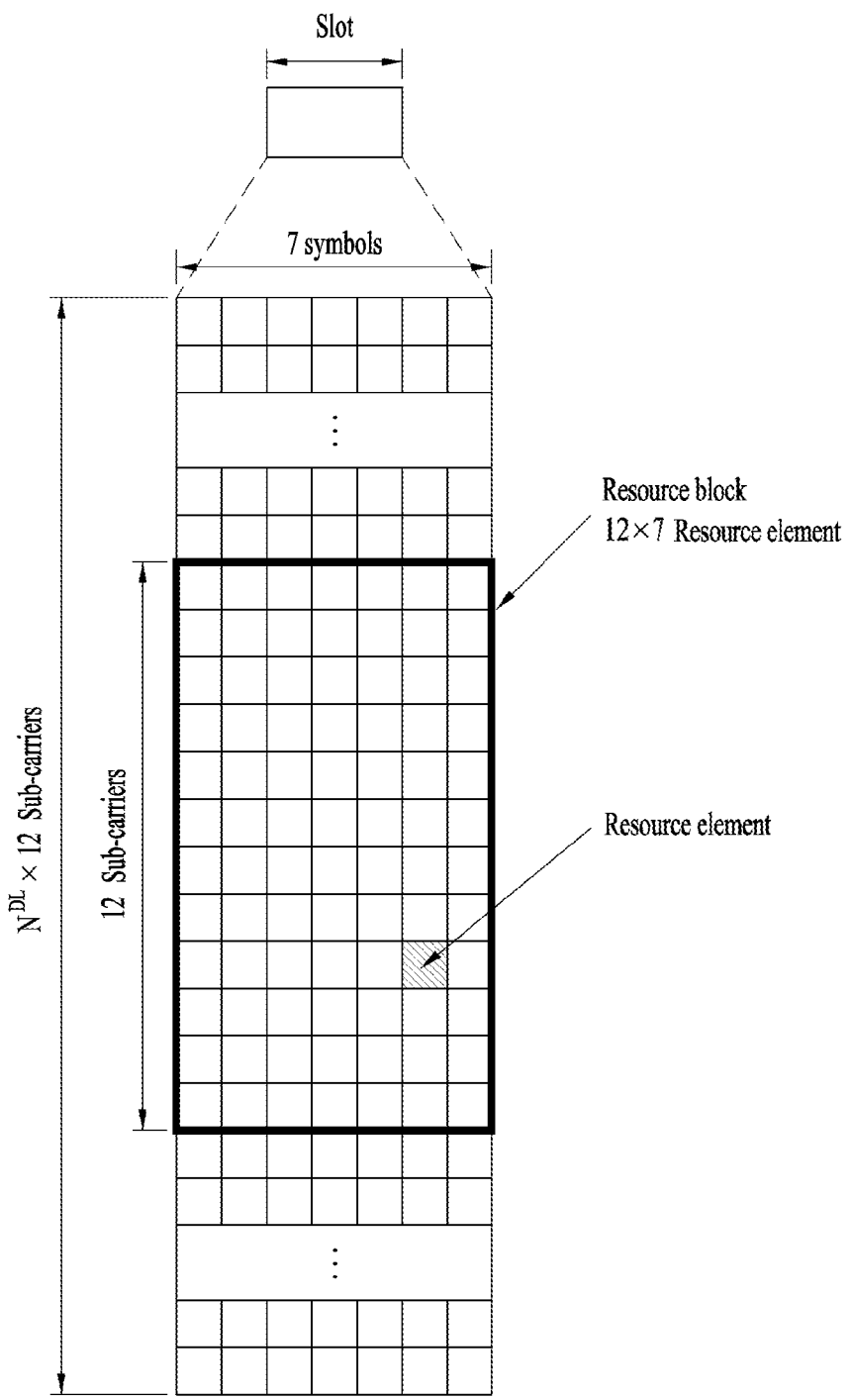
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

Figure 4:
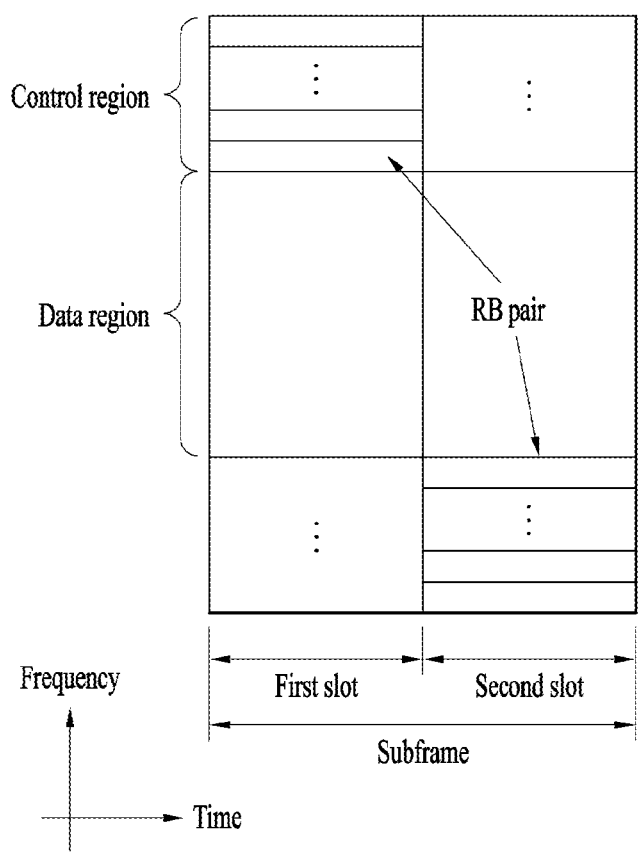
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of 1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE}$ $(=\lfloor N_{REG}/9 \rfloor)$ and the CCEs are indexed from 0 to $N_{CCE}-1$.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
| --- | --- |
| Format 0 | Resource grants for the PUSCH transmissions (uplink) |
| Format 1 | Resource assignments for single codeword PDSCH transmissions (transmission modes 1, 2 and 7) |

TABLE 3-continued

| DCI Format | Description |
| --- | --- |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;

(4) Transmission mode 4: Closed-loop spatial multiplexing;

(5) Transmission mode 5: MU-MIMO;

(6) Transmission mode 6: Closed-loop rank-1 precoding;

(7) Transmission mode 7: Precoding supporting a single layer transmission, which does not based on a codebook (Rel-8);

(8) Transmission mode 8: Precoding supporting up to two layers, which do not based on a codebook (Rel-9);

(9) Transmission mode 9: Precoding supporting up to eight layers, which do not based on a codebook (Rel-10); and

(10) Transmission mode 10: Precoding supporting up to eight layers, which do not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a $k^{th}$ subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1, 2, 4, 8\}$. The CCEs of PDCCH candidate set m in the SS may be determined by the following equation.

$$L \cdot \{Y_k + m\} \bmod \lfloor N_{CCE,k}/L \rfloor\} + i \qquad \text{[Equation 1]}$$

In [Equation 1], $M^{(L)}$ is the number of PDCCH candidates with CCE aggregation level L to be monitored in the SS, m=0, ..., $M^{(L)}$-1, i is the index of a CCE in each PDCCH candidate, and i=0, ..., L-1. k=$\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels (4, 8) and the USS supports PDCCHs with CCE aggregation levels {1, 2, 4, 8}. [Table 5] illustrates PDCCH candidates monitored by a UE.

TABLE 5

| Type | Search space $S_k^{(L)}$ Aggregation level L | Size [in CCEs] | Number of PDCCH candidates $M^{(L)}$ |
| --- | --- | --- | --- |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k = (A \cdot Y_{k-1}) \bmod D \qquad [\text{Equation 2}]$$

In [Equation 2], $Y_{-1} = n_{RNTI} \neq 0$, $n_{RNTI}$ indicating an RNTI value. A=39827 and D=65537.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
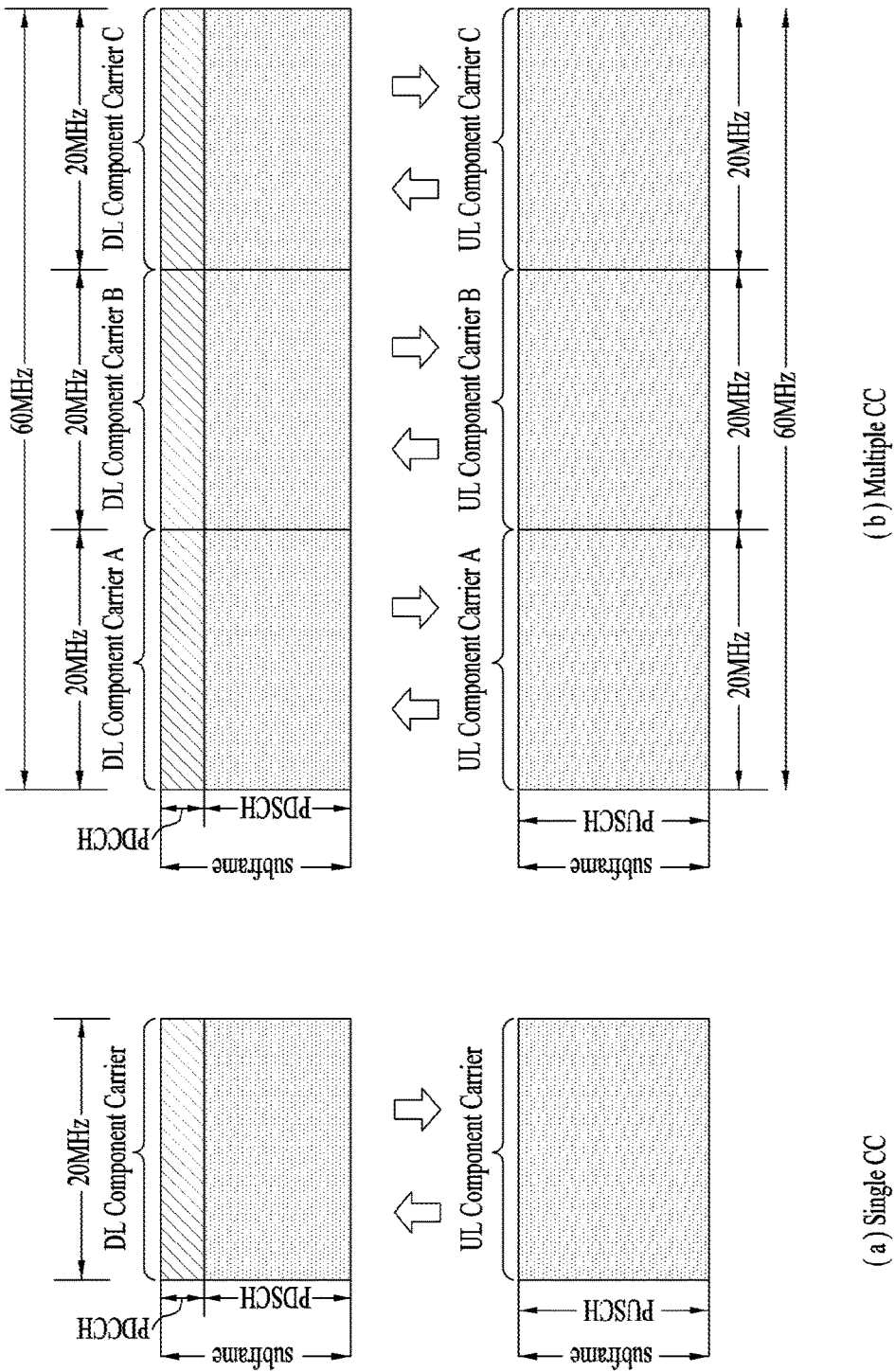
FIG. 6 is a view illustrating an example of Component Carriers (CCs) and Carrier Aggregation (CA) in a Long Term Evolution-Advanced (LTE-A) system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
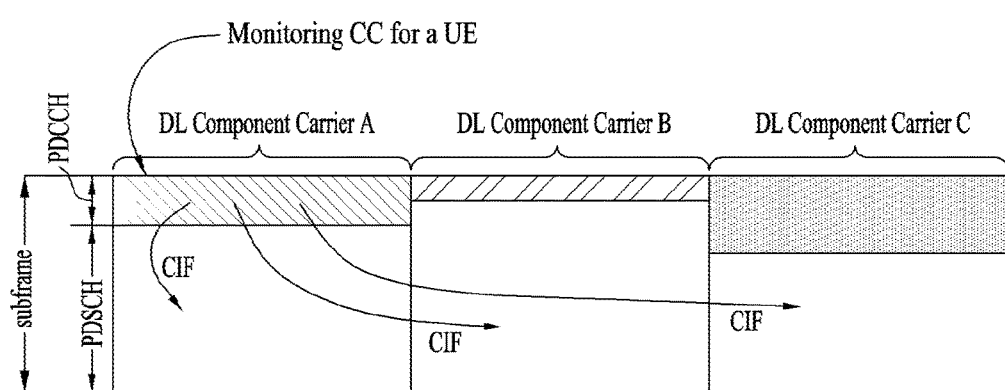
FIG. 7 is a view illustrating a subframe structure based on cross-carrier scheduling in the LTE-A system.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
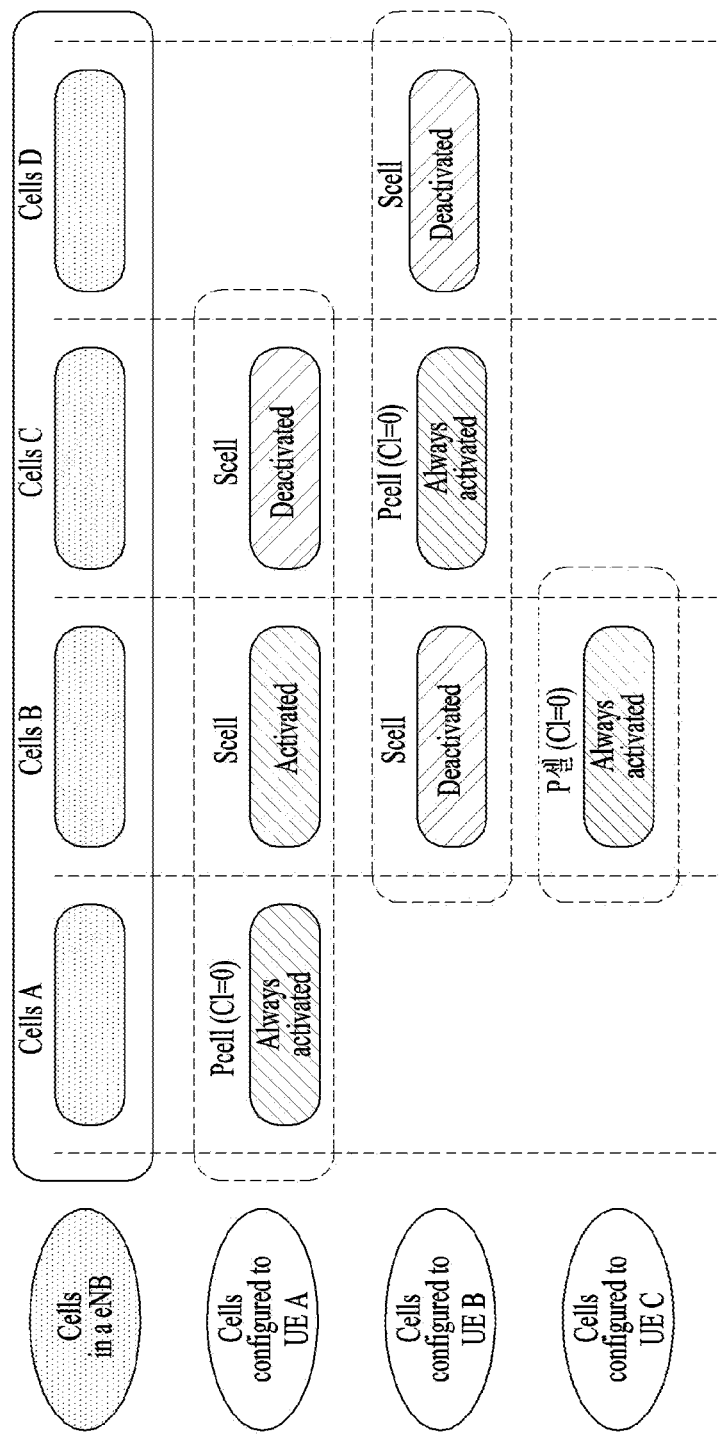
FIG. 8 is a view illustrating a configuration of serving cells according to cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and S Cell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

Sounding Reference Signal (SRS)

3.1 SRS in LTE/LTE-A System

Figure 9:
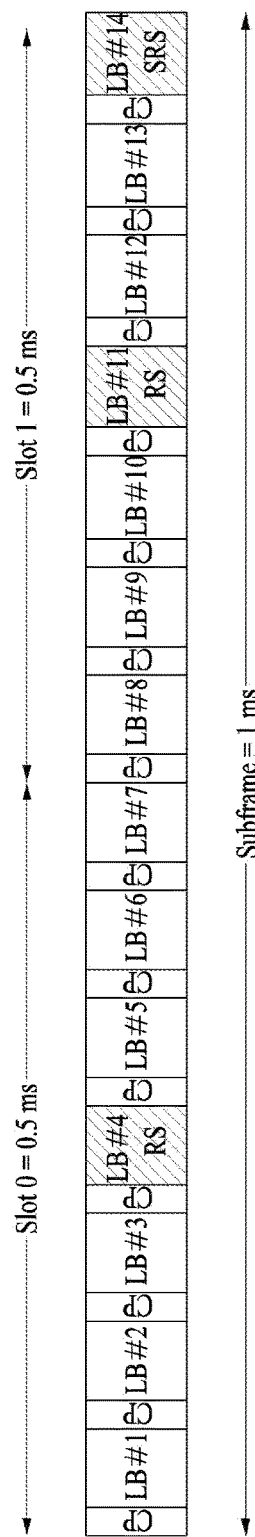
FIG. 9 is a view illustrating one of Sounding Reference Signal (SRS) transmission methods used in embodiments of the present disclosure.

FIG. 9 illustrates one of methods for transmitting SRS used at embodiments of the present invention.

An SRS is used for channel quality estimation to enable frequency-selective scheduling on uplink. At this time, SRS transmission is performed regardless of uplink data transmission and/or uplink control information transmission. The SRS may be used for the purpose of enhancing power control or supporting various start-up functions for UEs not recently scheduled. For example, the various start-up functions include initial modulation and coding scheme (MCS) selection, initial power control for data transmission, timing advance (TA), and so-called frequency semi-selective scheduling. At this time, frequency semi-selective scheduling means that the frequency resource is assigned selectively for the first slot of a subframe and hops pseudorandomly to a different frequency in the second slot.

In addition, the SRS can be used for downlink channel quality estimation under the assumption that the wireless channel is reciprocal between uplink and downlink. This assumption is especially valid in a time division duplex (TDD) system where the uplink and downlink share the same frequency spectrum and are separated in the time domain.

The subframes in which SRSs are transmitted by any UE within the cell are indicated by cell-specific broadcast signaling. A 4-bit cell-specific 'srsSubframeConfiguration' parameter indicates 15 possible sets of subframes in which an SRS may be transmitted within each radio frame. This configurability provides flexibility in adjusting the SRS overhead depending on deployment scenario. A 16$^{th}$ configuration switches the SRS off completely in the cell, which may for example be appropriate for a cell serving primarily high-speed UEs.

The SRS transmissions are always performed in the last SC-FDMA symbol in the configured subframes. Thus, the SRS and DM RS are located in different SC-FDMA symbols. PUSCH data transmission is not permitted on the SC-FDMA symbol designated for SRS, resulting in a worst-case sounding overhead of up to 7% in every subframe.

Each SRS symbol is generated by basis sequences where for a given time instance and bandwidth all the UEs in a cell use the same basis sequence while SRS transmissions from multiple UEs in the same time and band in a cell are distinguished orthogonally by different cyclic shifts of the basis sequence assigned to different UEs. SRS sequences from different cells can be distinguished by assigning different basis sequences in different cells where orthogonality is not guaranteed between different basis sequences.

3.2 Method for Transmitting Sounding Signal by UE

Hereinafter, a description will be given of methods for a UE to transmit an SRS.

A UE may transmit an SRS on an SRS resource per serving cell based on two trigger types. Trigger type 0 means a periodic SRS transmission method indicated by higher layer signaling and trigger type 1 means a periodic SRS transmission method requested by DCI format 0/4/1A transmitted through PDCCH for FDD and TDD schemes or DCI format 2B/2C/2D transmitted through PDCCH for the TDD scheme.

If both of the SRS transmission according to the trigger type 0 and the SRS transmission according to the trigger type 1 occurs at the same subframe in the same serving cell, the UE performs only the SRS transmission according to the trigger type 1. The user equipment may be assigned SRS parameters for the trigger type 0 and/or trigger type 1 in each serving cell. Hereinafter, a description will be given of the SRS parameters, which are configured serving-cell-specifically or semi-statically for the trigger type 0 and/or trigger type 1 by a higher layer signal.

The transmission comb, $\bar{k}_{TC}$ defined in clause 5.5.3.2 of 3GPP TS 36.211 is configured for the trigger type 0 and each configuration of the trigger type 1, respectively.

The starting physical resource block assignment parameter, $n_{RRC}$ defined in clause 5.5.3.2 of 3GPP TS 36.211 is configured for the trigger type 0 and each configuration of the trigger type 1, respectively.

A duration parameter for the trigger type 0 may be configured for a single subframe. Alternatively, the duration parameter may be indefinitely configured until it is released.

A srs-ConfigIndex $I_{SRS}$ parameter indicating an SRS transmission period, $T_{SRS}$ and an SRS subframe offset, $T_{offset}$ for the trigger type 0 is defined in Table 7 and Table 8 below. A srs-ConfigIndex parameter, $I_{SRS}$ indicating an SRS transmission period, $T_{SRS,1}$ and an SRS subframe offset, $T_{offset,1}$ for the trigger type 1 is defined in Table 10 and Table 11 below.

The SRS bandwidth parameter, $B_{SRS}$ defined in 5.5.3.2 of 3GPP TS 36.211 is configured for the trigger type 0 and each configuration of the trigger type 1, respectively.

The frequency hopping bandwidth parameter, $b_{hop}$ defined in 5.5.3.2 of 3GPP TS 36.211 is configured for the trigger type 0.

The cyclic shift parameter, $n_{SRS}^{cs}$ defined in 3GPP TS 36.211 is configured for the trigger type 0 and each configuration of the trigger type 1.

An antenna port number parameter, $N_p$ is configured for the trigger type 0 and each configuration of the trigger type 1.

For the trigger type 1 and DCI format 4, three sets of SRS parameters (e.g., srs-ConfigApDCI-Format4) is configured by a higher layer signal. 2-bit of an SRS request field contained in the DCI format 4 indicates an SRS parameter set shown in Table 6 below.

TABLE 6

| Value of SRS request filed | Description |
| --- | --- |
| '00' | No type 1 SRS trigger |
| '01' | The 1st SRS parameter set configured by higher layers |
| '10' | The 2nd SRS parameter set configured by higher layers |
| '11' | The 3rd SRS parameter set configured by higher layers |

For the trigger type 1 and DCI format 0, one SRS parameter set, srs-ConfigApCDI-Format0 is configured by higher layer signaling. For the trigger type 1 and DCI format 1A/2B/2C/2D, one common SRS parameter set, srs-ConfigApCDI-Format1a2b2c is configured by higher layer signaling.

If 1 bit of an SRS request field contained in the DCI format 0/1A/2B/2C/2D is set to '1', the trigger type 1 can be triggered (i.e., positive SRS request). If the UE is assigned the SRS parameters for the DCI format 0/1A/2B/2C/2D through higher layer signaling, 1 bit of the SRS request field is included in the DCI format 0/1A with respect to frame structure type 1 and 1 bit of the SRS request field is included in the DCI format 0/1A/2B/2C/2D with respect to the frame structure type 2.

A serving-cell-specific SRS transmission band $C_{SRS}$ and serving-cell-specific SRS transmission subframes are configured by higher layer signaling (e.g., MAC message. RRC message, etc.).

If a UE supporting transmit antenna selection is allowed (or activated) to select an antenna in a given serving cell, an index of the UE antenna for transmitting SRS during a time $n_{SRS}$ is determined according to Equation 3 or Equation 4.

$$a(n_{SRS}) = n_{SRS} \bmod 2 \quad \text{[Equation 3]}$$

[Equation 3] shows a UE antenna index in case that frequency hopping is deactivated in some or all of a sounding bandwidth (i.e., $b_{hop} \geq B_{SRS}$).

$$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases} \quad \text{[Equation 4]}$$

$$\beta = \begin{cases} 1 & \text{where } K \bmod 4 = 0 \\ 0 & \text{otherwise} \end{cases}$$

[Equation 4] shows a UE antenna index in case that frequency hopping is activated (i.e., $b_{hop} < B_{SRS}$). The parameter values $B_{SRS}$, $b_{hop}$, $N_b$, and $n_{SRS}$ of Equation 3 and Equation 4, which are incorporated herein by reference, can be found in clause 5.5.3.2 of 3GPP TS 36.211. Except for the case where single SRS transmission is assigned to the UE, K is set to $$K = \prod_{b'=b_{hop}}^{B_{SRS}} N_{b'}.$$

In this case, it is assumed that $N_{b_{hop}} = 1$ regardless of a value of $N_b$. If the UE is connected to at one or more serving cells, the UE is not expected to transmit SRS on different antenna ports simultaneously.

The UE may be configured to transmit SRS on $N_p$ antenna ports of a serving cell where $N_p$ may be informed the UE through a higher layer signal. In case of PUSCH transmission mode 1, $N_p$ is set to $N_p \in \{0, 1, 2, 4\}$. In case of PUSCH transmission mode 2 with two antenna ports configured for PUSCH, $N_p$ is set to $N_p \in \{0, 1, 2\}$. In case of four antenna ports configured for PUSCH, $N_p$ is set to $N_p \in \{0, 1, 4\}$.

In case of a UE configured to transmit SRS on multiple antenna ports of the serving cell, the UE should transmit SRS for all the configured transmit antenna ports within one SC-FDMA symbol of the same subframe of the corresponding serving cell. The SRS transmission bandwidth and starting physical resource block assignment parameters are the same for all the configured antenna ports of the corresponding serving cell.

In case of a UE not configured with multiple TAGs (timing advanced group), the UE does not transmit SRS whenever SRS transmission and PUSCH transmission overlap each other in the same symbol. Here, TAG means a group of serving cells with the same TA, which is used for matching uplink synchronization with an eNB in a carrier aggregation (CA) environment.

In the case of TDD, if there is one SC-FDMA symbol in UpPTS of a given serving cell, the SC-FDMA symbol can be used for SRS transmission. If there are two SC-FDMA symbols in UpPTS of a given serving cell, the two SC-FDMA symbols may be assigned to the same UE and both of them can be used for SRS transmission.

When trigger type 0 SRS transmission and PUCCH format 2/2a/2b transmission collide with each other in the same subframe, the UE not configured with the multiple TAGs does not perform the trigger type 0 SRS transmission. When trigger type 1 SRS transmission and PUCCH format 2a/2b transmission or PUCCH format 2 transmission for HARQ information transmission collide with each other in the same subframe, the UE not configured with the multiple TAGs does not perform the trigger type 1 SRS transmission. When PUCCH format 2 transmission of which the purpose is not to transmit HARQ information and the trigger type 1 SRS transmission collide with each other in the same subframe, the UE not configured with the multiple TAGs does not perform the PUCCH format 2 transmission.

In case that an ackNackSRS-SimultaneousTransmission parameter is set to 'FALSE', if SRS transmission, PUCCH transmission for HARQ-ACK information transmission, and/or positive SR collide with each other in the same subframe, the UE not configured with the multiple TAGs does not perform the SRS transmission. In case that the ackNackSRS-SimultaneousTransmission parameter is set to 'TRUE', if the SRS transmission, the PUCCH transmission for the HARQ-ACK information transmission, and/or a shortened format of positive SR collide with each other in the same subframe, the UE not configured with the multiple TAGs performs the SRS transmission.

If the SRS transmission, PUCCH transmission for the HARQ information transmission, and/or a common PUCCH format of positive SR collide with each other in the same subframe, the UE not configured with the multiple TAGs does not perform the SRS transmission.

If an interval for the SRS transmission overlaps with a PRACH region for preamble format 4 in UpPTS or the interval exceeds the range of an uplink system bandwidth configured in the serving cell, the UE does not perform the SRS transmission.

Whether the UE simultaneously transmits PUCCH carrying HARQ-ACK information and SRS in the same subframe is determined based on the ackNackSRS-Simultaneous Transmission parameter provided by a higher layer. If the UE is configured to transmit the PUCCH carrying the HARQ-ACK information and the SRS in the same subframe, the UE transmits the HARQ-ACK and SR in cell-specific SRS subframes of a primary cell by using a shortened PUCCH format. In this case, the HARQ-ACK or an SR symbol corresponding to a location of the SRS is punctured. Even if the UE does not transmit SRS in a cell-specific SRS subframe of the primary cell, the shortened PUCCH format is used in the corresponding subframe. Otherwise, the UE uses common PUCCH format 1/1a/1b or common PUCCH format 3 in order to transmit the HARQ-ACK and SR.

[Table 7] and [Table 8] show trigger type 0 of an SRS configuration with respect to an SRS transmission periodicity parameter, $T_{SRS}$ and an SRS subframe offset parameter, $T_{offset}$ defined in FDD and TDD, respectively.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 8

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

The SRS transmission periodicity parameter $T_{SRS}$ is a serving-cell-specific value and is selected from a set of {2, 5, 10, 20, 40, 80, 160, 320} ms or subframes. In the case of the periodicity parameter $T_{SRS}$ set to 2 ms in the TDD, two SRS resources are configured in a half frame including UL subframes in a given serving cell.

In the case of $T_{SRS}>2$ in the TDD or FDD, the trigger type 0 of SRS transmission instances are determined as subframes satisfying the condition of $(10 \cdot n_f + k_{SRS} - T_{offset}) \bmod T_{SRS} = 0$ in a given serving cell. Here, in the case of FDD, $k_{SRS} = \{0, 1, \ldots, 9\}$ means an index of a subframe in a frame and in the case of TDD, $k_{SRS}$ is defined as shown in Table 9 below. Moreover, in case of $T_{SRS}=2$ in TDD, SRS transmission instances are determined as subframe satisfying the condition of $(k_{SRS} - T_{offset}) \bmod 5 = 0$.

TABLE 9

| | subframe index n | | | | | | | | | |
|---|---|---|---|---|---|---|---|---|---|---|
| | 0 | 1 | | 2 | 3 | 4 | 5 | 6 | | 7 | 8 | 9 |
| | | 1st symbol of UpPTS | 2nd symbol of UpPTS | | | | | 1st symbol of UpPTS | 2nd symbol of UpPTS | | | |
| $k_{SRS}$ in case UpPTS length of 2 symbols | | 0 | 1 | 2 | 3 | 4 | 5 | 6 | | 7 | 8 | 9 |
| $k_{SRS}$ in case UpPTS length of 1 symbol | | 1 | | 2 | 3 | 4 | | 6 | | 7 | 8 | 9 |

[Table 10] and [Table 11] show SRS transmission periodicity, $T_{SRS,1}$ and SRS subframe offset, $T_{offset,1}$ defined in FDD and TDD, respectively, in the case of trigger type 1 of SRS transmission.

TABLE 10

| SRS Configuration Index $I_{SRS}$ | SRS Periodicity $T_{SRS,1}$ (ms) | SRS Subframe Offset $T_{offset,1}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-31 | reserved | reserved |

TABLE 11

| SRS Configuration Index $I_{SRS}$ | SRS Periodicity $T_{SRS,1}$ (ms) | SRS Subframe Offset $T_{offset,1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-31 | reserved | reserved |

The periodicity parameter for SRS transmission, $T_{SRS,1}$ is a serving-cell-specific value and is selected from a set of {2, 5, 10} ms or subframes. In case that the SRS transmission periodicity is set to 2 ms in the TDD, two SRS resources are configured in a half frame including UL subframes in a given serving cell.

In case of a UE configured with type 1 SRS transmission in serving cell c and not configured with a carrier indicator filed, if the UE detects a positive SRS request from PDCCH/EPDCCH for scheduling PUSCH/PDSCH, the UE transmits SRS in serving cell c.

In the case of a UE configured with type 1 SRS transmission in serving cell c and configured with a carrier indicator field, if the UE detects a positive SRS request from PDCCH/EPDCCH for scheduling PUSCH/PDSCH, the UE transmits SRS in serving cell c corresponding to the carrier indicator filed.

If a UE configured with type 1 SRS transmission in serving cell c detects a positive SRS request from subframe n of serving cell c, in case of $T_{SRS,1}>2$ in TDD, the UE initiates SRS transmission in a first subframe satisfying the conditions of n+k, k≥4 and $(10 \cdot n_f + k_{SRS} - T_{offset,1}) \mod T_{SRS,1} = 0$. Alternatively, in case of $T_{SRS,1}=2$ in TDD, the UE initiates SRS transmission in a first subframe satisfying the condition of $(k_{SRS} - T_{offset,1}) \mod 5 = 0$. Here, in the case of FDD, $k_{SRS}=\{0, 1, \ldots 9\}$ means a subframe index of frame $n_f$.

A UE configured with trigger type 1 SRS transmission is not expected to receive a type 1 SRS triggering event related to trigger type 1 SRS transmission parameters, which are configured with different values with respect to the same serving cell and the same subframe by higher layer signaling.

If SRS transmission collides with retransmission of the same transport block or PUSCH transmission corresponding to a random access response as part of a contention-based random access procedure, a UE does not transmit SRS.

3.3 Periodic SRS Transmission and Aperiodic SRS Transmission

Figure 10:
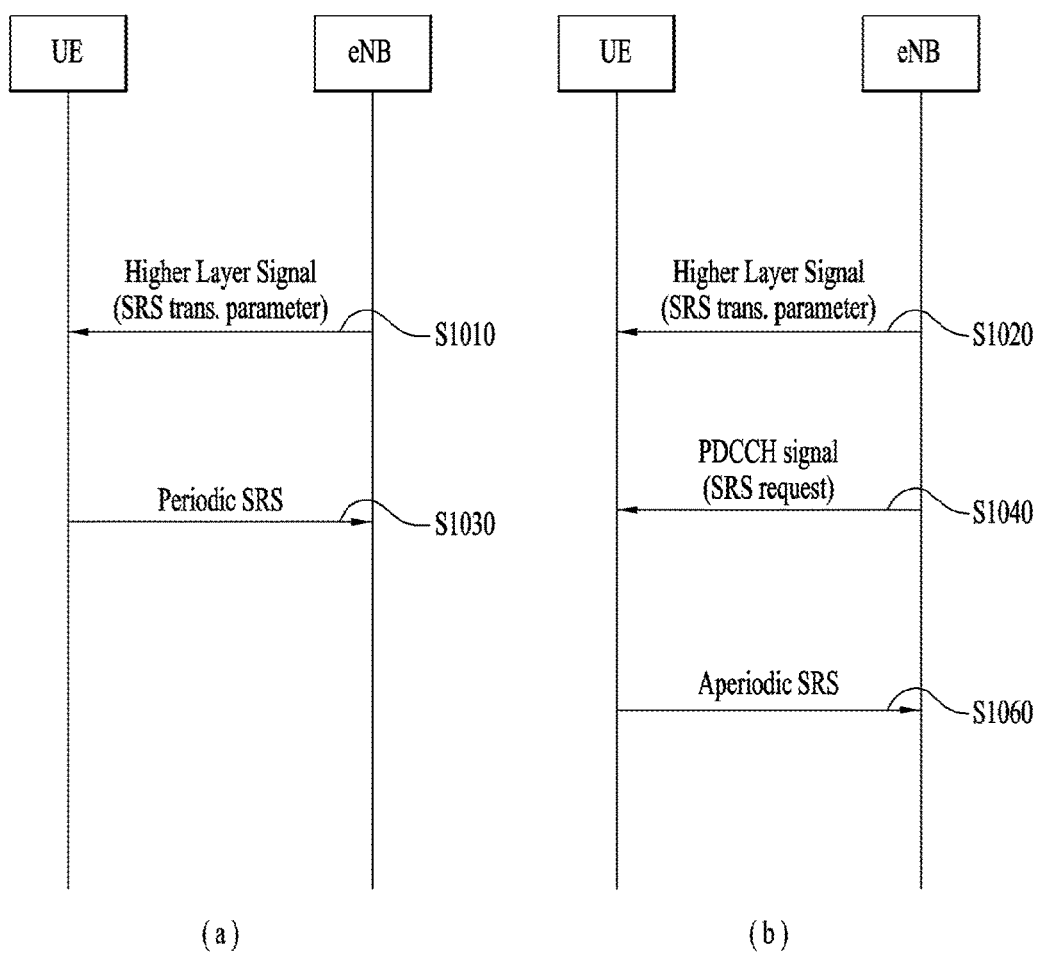
FIG. 10 (a) is a view illustrating the concept of periodic SRS transmission, and FIG. 10 (b) is a view illustrating the concept of aperiodic SRS transmission.

FIG. 10(a) is a view illustrating the concept of periodic SRS transmission, and FIG. 10 (b) is a view illustrating the concept of aperiodic SRS transmission.

First, periodic SRS transmission will be described. Referring to FIG. 10(a), SRS transmission parameters for SRS transmission are transmitted from an eNB to a UE via a higher layer signal (e.g., an RRC signal) (S1010).

The SRS transmission parameters may include an SRS transmission bandwidth parameter indicating bandwidth occupied by one SRS transmission, a hopping bandwidth parameter indicating a frequency region in which SRS transmission hops to a frequency, a frequency position parameter indicating a position where SRS transmission starts in the frequency region, a transmission comb parameter indicating an SRS transmission position or pattern, a cyclic shift parameter for distinguishing between SRSs, a period parameter indicating an SRS transmission period and a subframe offset parameter indicating a subframe in which an SRS is transmitted. At this time, the subframe offset parameter may indicate a cell-specific SRS subframe or a UE-specific SRS subframe.

The UE may periodically perform SRS transmission at a time interval of 2 ms to 160 ms based on the SRS transmission parameters (S1030).

At this time, since SRS symbols cannot be used for PUSCH transmission, all UEs within the cell may previously know in which subframe SRS transmission is performed in the cell.

Next, aperiodic SRS transmission will be described. Aperiodic SRS transmission is triggered through signaling on a PDCCH as part of scheduling grant. The frequency region structure of aperiodic SRS transmission is equal to that of periodic SRS transmission. However, when an aperiodic SRS is transmitted is determined per UE via higher layer signaling.

Referring to FIG. 10(b), SRS transmission parameters for SRS transmission are transmitted from an eNB to a UE via a higher layer signal (e.g., an RRC signal) (S1020).

At this time, the SRS transmission parameters used for aperiodic SRS transmission are basically equal to those used for periodic SRS transmission.

The eNB transmits a PDCCH signal or an E-PDCCH signal having an SRS request field to the UE when aperiodic SRS transmission is requested. At this time, the E-PDCCH signal means control information transmitted via a PDSCH region. In addition, for the description of the PDCCH signal, refer to Chapter 1 (S1040).

The UE, which has explicitly received the request for aperiodic SRS transmission in step S1140, may perform aperiodic SRS transmission in the subframe (S1060).

4. SRS Transmission Method for MTC UE 4.1 MTC UE

In the LTE-A system, implementation of a low-price/low-specification user equipment focusing on data communication such as reading of a meter, measurement of a water level, utilization of a monitoring camera, stock management of a vending machine, and the like is considered for the next generation wireless communication system. In the embodiments of the present invention, such a low-price/low-specification user equipment is called a machine type communication (MTC) user equipment for convenience.

In case of an MTC UE, since the amount of transmitted data is relatively small and uplink/downlink data transmission and reception is performed occasionally, it is efficient to lower a price of the MTC UE and to reduce battery consumption according to the low data transmission rate. Such an MTC UE has a characteristic of low mobility and thus its channel environment is rarely changed. In the current LTE-A, it has been considered to allow the MTC UE to have a coverage wider than the previous one. To this end, various techniques for coverage enhancement have been also discussed.

The MTC UE may be installed in an area (e.g., a basement, etc.) with poor transmission conditions compared to the legacy UE (i.e., normal UE). For such MTC UEs, a relay node can be installed but the cost of investment in facilities may be too high. Therefore, it is effective to provide stable communication to the MTC UE operating in an area with poor radio conditions by repeatedly transmitting a downlink or uplink channel.

Hereinafter, SRS transmission methods for the MTC UE will be described in detail. The following SRS transmission methods can be operated based on the methods described in clauses 1 to 3.

4.2 SRS Transmission Method-1

SRS is transmitted on an uplink channel to support uplink channel measurement at an eNB and then it is used to perform scheduling for PUSCH. In this case, a channel environment where an MTC UE is placed may have poor radio conditions. Thus, the MTC UE may be configured to repeatedly transmit the SRS to enable the eNB to perform channel estimation efficiently.

4.2.1 SRS Configuration Method for MTC UE

SRS from an MTC UE can be configured to be repeatedly transmitted. Transmission of an SRS sequence is determined by cell-specific parameters and UE-specific parameters. In this case, it is preferred to perform the repeated SRS transmission in a time domain. To this end, a sequence characteristic and a transmission band of the SRS can be configured consistently during an interval for transmitting the SRS repeatedly.

The SRS transmission band is determined based on an SRS bandwidth and an SRS hopping related parameter. Each of the SRS bandwidth and SRS hopping related parameter may be configured to maintain a constant value during the SRS repeat transmission interval.

The SRS sequence can be determined by (1) a sequence group number u, (2) a base sequence number v determined according to a transmission band and presence of sequence hopping, (3) a cyclic shift parameter corresponding to an SRS transmission parameter, and (4) an SRS transmit antenna port as defined in 3GPP TS 36.211.

The reason for the repeated SRS transmission in the time domain is to improve performance of the uplink channel estimation at the eNB through combining SRSs, which are received by the eNB. Thus, it is preferred that there is no change in the SRS sequence during the repeat transmission interval. In other words, the same SRS sequences can be repeatedly transmitted.

To this end, the parameter values u and v, which are used in determining the SRS sequence, are preferred to be fixed in the repeat transmission interval. In addition, sequence group hopping for the SRS may be deactivated or each of the parameter values u and v may be set to a constant value in the repeat transmission interval.

Hereinafter, a description will be given of a method for configuring the sequence group number u. The parameter value u for the repeated SRS transmission can be defined according to Equation 5 below.

$$u=(f_{gh}(n_p)+f_{ss}) \mod 30 \quad \quad \text{[Equation 5]}$$

In [Equation 5], $f_{gh}$ is a function indicating a group hopping pattern and $f_{ss}$ indicates an SRS sequence shift pattern. In this case, $f_{ss}$ is determined as a value satisfying the condition of $f_{ss}=f_{ss}^{PUCCH}=N_{ID}^{cell} \mod 30$. $N_{ID}^{cell}$ means a cell identifier and $n_p$ indicates an SRS transmission period. That is, in this case, the same SRS sequence is used in all SRS repeat transmission intervals. If the sequence group hopping is disabled, $f_{gh}(n_p)$ may be set to 0 (i. e., $f_{gh}(n_p)$=0).

As another method, if it is configured that sequence group hopping is maintained consistently during a first SRS repeat transmission interval and a different SRS sequence is used in a next SRS repeat transmission interval, $f_{gh}(n_p)$, which is function of an SRS transmission period $(n_p)$, may have a random value. In other words, the UE may transmit the SRS using different SRS sequences every SRS repeat transmission period. However, even in this case, the same SRS sequence is repeatedly transmitted in one SRS repeat transmission period.

Hereinafter, a description will be given of a method for configuring a base sequence number v. In case that the SRS transmission band is equal to or less than 6 RB, the value v can be set to 0'O' similar to that of the conventional LTE/LTE-A system. If the SRS transmission band is equal to or greater than 6 RB, the value v can also be set to '0' by deactivating the sequence hopping. That is, according to the conventional LTE/LTE-A system, when the sequence hopping is activated, the v has different values. On the other hand, in case that the MTC UE transmits the SRS repeatedly, the v has the same value.

Alternatively, similar to a sequence group hoping method, the SRS sequence hopping can be configured to have a constant v value in one repeat transmission interval and have a different v value in a next repeat transmission interval. In this case, the value v may set the function of the SRS transmission period $(n_p)$ to have a random value.

As described in the methods, the UE can generate and transmit the SRS according to parameter values configured by the eNB. In this case, the UE may generate the same SRS sequence and repeatedly transmit the same sequence in all SRS transmission intervals. Alternatively, the UE may generate a different SRS sequence and repeatedly transmit the different SRS sequence in each SRS transmission interval.

4.2.2 SRS Transmission Method

In an MTC environment, a transmission bandwidth of an MTC UE may be restricted to a specific bandwidth (e.g., 6 PRB). In this case, a transmission bandwidth of SRS to be transmitted by the UE may also be restricted. However, since a system bandwidth may be greater than the transmission bandwidth supported by the MTC UE, the SRS may be configured to be transmitted through a subband in order for the MTC UE to be scheduled with the subband. For instance, the system bandwidth may be divided into a plurality of subbands corresponding to the bandwidth of the MTC UE and the SRS may be configured to be transmitted through at least one of the corresponding subbands.

In this case, the order of SRS transmission through the subband may be configured according to the order of subband indices (e.g., frequency descending order of subband indices) or a predetermined order. Thus, the UE may transmit the SRS through the subband in the above order. When the SRS is transmitted through at least one of the subbands, it is preferred that after completion of the repeated SRS transmission in one subband, the repeated SRS transmission is initiated in a next subband.

To perform the repeated SRS transmission in the time domain, the UE needs to be configured with a plurality of SRS configurations. For example, it is preferred that an eNB configures a UE to repeatedly transmit SRS in SRS subframes commonly configured in a serving cell. Particularly, the SRS subframes commonly configured in the serving cell may be (1) cell-specific SRS subframes, which are assigned to a general UE in the conventional LTE/LTE-A system, for SRS transmission or (2) new cell-specific SRS subframes defined for an MTC UE. In other words, a cell-specific MTC SRS subframe can be defined for the repeated SRS transmission of the MTC UE.

The following methods can be considered for the repeated SRS transmission.

(1) Method 1: The eNB can explicitly inform the UE of subframes to be used in the repeated SRS transmission among the cell-specific SRS subframes. In this case, the repeated SRS transmission may be performed only in the subframes indicated by the eNB and normal SRS transmission may be performed in the rest of the subframes. That is, the repeated SRS transmission may not be continuously performed in each SRS transmission period.

(2) Method 2: The eNB can indicate the number of subframes required for the repeated transmission starting from a UE-specific SRS subframe offset among the cell-specific SRS subframes. In the embodiments of the present invention, the UE-specific SRS subframes can be considered to be included in the cell-specific SRS subframes.

According to the method 2, the repeated SRS transmission can be continuously performed only in UE-specific SRS subframes indicated by the eNB among the cell-specific SRS subframes. For instance, the SRS transmission is performed only in the subframes indicated by the eNB and the repeated SRS transmission may not be performed in the remaining SRS transmission period.

(3) Method 3: The eNB can explicitly indicate a first subframe number (i.e., subframe offset) of a UE-specific SRS subframe for performing the repeated SRS transmission and a last SRS subframe among the cell-specific SRS subframes.

According to the method 3, the UE can repeatedly transmit the SRS in the cell-specific SRS subframes in the range of from the first subframe corresponding to the SRS subframe offset to the last SRS subframe indicated by the eNB. Depending on a cell-specific SRS subframe configuration, the repeated SRS transmission may not be performed on consecutive SRS subframes. For instance, when the cell-specific SRS subframes are not configured in a consecutive manner, the SRS may be repeatedly transmitted only in cell-specific SRS subframes contained in an SRS repeat transmission period and not be repeatedly transmitted in the remaining subframes.

FIG. 11 is a view illustrating one of methods for repeatedly transmitting an SRS by an MTC UE, in the case of trigger type 0 as an SRS transmission scheme. In particular, FIG. 11 (a) shows a method for a normal UE to transmit SRS periodically, and FIG. 11 (b) shows a method for an MTC UE to transmit SRS periodically.

FIG. 12 is a view illustrating one of methods for repeatedly transmitting an SRS by an MTC UE, in the case of trigger type 1 as an SRS transmission scheme. In particular, FIG. 12 (a) shows a method for a normal UE to transmit SRS aperiodically, and FIG. 12 (b) shows a method for an MTC UE to transmit SRS aperiodically.

The SRS transmission method described in clause 3 can be referred for the SRS transmission methods in FIG. 11 (a) and FIG. 12 (a). Moreover, the methods 1 to 3 explained in clause 4.2.2 can be applied to the SRS transmission methods for the MTC UE in FIG. 11 (b) and FIG. 12 (b). In each of FIG. 11 (b) and FIG. 12 (b), the MTC UE may generate SRS according to the SRS configuration method described in clause 4.2.1 and then repeatedly transmit the generated SRS a predetermined number of times in each SRS transmission period or in a subframe where an SRS transmission request is received.

In this case, the SRS may be repeatedly transmitted only in SRS subframes indicated by an eNB among cell-specific SRS subframes (method 1). Alternatively, the SRS may be repeated transmitted only in SRS subframes indicated by an eNB among UE-specific SRS subframes of cell-specific SRS subframes (method 2 or method 3).

In this case, if the cell-specific SRS subframes are not configured in a consecutive manner, the MTC UE may repeatedly transmit the SRS only in cell-specific SRS subframes within the predetermined number of subframes reserved for the repeated SRS transmission (1). Alternatively, the MTC UE may repeatedly transmit the SRS in cell-specific SRS subframes of a first SRS repeat transmission interval. However, if the MTC UE fails to repeatedly transmit the SRS the predetermined number of times, the MTC UE may repeatedly transmit the SRS the remaining number of times in cell-specific SRS subframes of a next SRS repeat transmission interval (2).

Alternatively, the eNB may set the number of repeated SRS transmission times and the SRS repeat transmission interval. For instance, it is assumed that the MTC UE needs to perform n times of the repeated SRS transmission in an MTC environment. When setting the SRS repeat transmission interval, the eNB may set the SRS repeat transmission interval in consideration of the number of repeated transmission times n, the number of cell-specific SRS subframes x, and the number of UE-specific SRS subframes y. In case of y>x>=n, the eNB may instruct the UE to perform n times of the repeated SRS transmission only. In case of y>n>x or x>n>y, the eNB may instruct the UE to increase a repeat transmission period as much as the number of repeated transmission times (n-x) or (n-y).

4.3 SRS Transmission Method-2

While transmitting SRS repeatedly, a UE may use different SRS transmission combs to facilitate multiplexing with SRS from another UE.

That is, there are two SRS transmission combs in a single RB. For repeated SRS transmission, an MTC UE may be configured to use a first SRS transmission comb in a repeat transmission interval and use a second SRS transmission comb for SRS transmitted in a different subframe. To this end, an eNB may inform an SRS transmission comb configuration through higher layer signaling/MAC signaling/L1 signaling.

4.4 SRS Transmission Restriction

Hereinafter, a description will be given of SRS transmission restriction methods applicable to the above-mentioned SRS transmission methods.

4.4.1 SRS Transmission Restriction According to Trigger Type

SRS transmission can be divided into trigger type 0 (i.e., periodic SRS transmission) in which transmission is performed according to a configuration of a higher layer and trigger type 1 (i.e., aperiodic SRS transmission) in which initiation of transmission is indicated by PDCCH. In this case, since an MTC UE is generally placed in poor MTC radio conditions, the MTC UE may be configured to support only one mode of the trigger type 0 and trigger type 1.

For instance, the MTC UE can be configured to support only the trigger type 1. In this case, only if there is a request from an eNB, the MTC UE can perform repeated SRS transmission. Of course, the MTC UE can be configured to support only the trigger type 0. When the trigger type 0 is supported only, the MTC UE may assume that there is no aperiodic SRS request from the eNB. In this case, an SRS request field, which is included in a DCI format, for the aperiodic SRS request may not be transmitted or it may be used for other purposes.

4.4.2 Operations in Simultaneous Transmission of SRS and Other Uplink Channels

When an MTC UE transmits SRS repeatedly, there may be a situation in which repeated SRS transmission needs to be performed in a subframe reserved for uplink control information transmission (e.g., HARQ-ACK transmission, SR (scheduling request) transmission, periodic CSI transmission and/or aperiodic CSI transmission, etc.). In this case, an eNB may enable the SRS transmission not to be performed in the corresponding subframe by using a higher layer signal (e.g., RRC signal. MMC signal, etc.) in advance. In other words, in case that an SRS repeat transmission interval overlaps with the subframe in which the transmission of the uplink control information is performed, the repeated SRS transmission may not be performed in the overlapping subframe.

In this case, even though the SRS is not actually transmitted, the eNB and/or UE may count the number of repeated transmission times by considering it as that the SRS transmission is performed. If the SRS is frequently dropped due to the simultaneous transmission of the SRS and other uplink channels, each UE has a different SRS repeat transmission period and it will increase complexity in multiplexing. However, according to the above method, the problem of increased complexity in multiplexing can be solved. In other words, although the MTC UE fails to repeatedly transmit the SRS a prescribed number of times until a next repeat transmission time due to the SRS drop after setting an SRS repeat transmission start time, the MTC UE and/or eNB can initiate new repeated SRS transmission based on SRS configuration information or SRS configuration parameters. This method has advantages of facilitating control by the eNB and reducing complexity of the system.

As another embodiment, the MTC UE can complete the repeated SRS transmission by counting the number of repeated times for actual SRS transmission. According to this embodiment, although complexity in SRS multiplexing is increased, channel estimation performance based on SRS can be enhanced.

4.4.3 Transmission Format Restriction Method

In case that there are subframes where repeated SRS transmission and repeated HARQ-ACK/SR transmission needs to be performed simultaneously, an MTC UE may be configured to perform the HARQ-ACK/SR transmission in cell-specific SRS subframes using a shortened format. Particularly, ackNackSRS-SimultaneousTransmission parameter for a normal UE of the LTE/LTE-A system and MTCackNackSRS-SimultaneousTransmission parameter for an MTC UE can be considered as examples. For example, in case that the ackNackSRS-Simultaneous Transmission parameter and the MATCackNackSRS-Simultaneous Transmission parameter are set to 'TRUE' and 'FALSE', respectively, an SRS transmission format in each of a legacy-cell-specific SRS subframe and an MTC-cell-specific SRS subframe can be determined according to configurations of the two parameters. As another example, instead of the two above-mentioned parameters, other parameters defined in the LTE/LTE-A system can be used. In this case, the SRS transmission format is configured in the form of the shortened format at all times.

However, for the HARQ-ACK/SR transmission, the MTC UE can be configured to use a common format in subframes except the cell-specific SRS subframes during an SRS repeat transmission interval. In this case, an eNB (i.e., receiving end) for receiving HARQ-ACK/SR may separately combine the HARQ-ACK/SR transmitted in the cell-specific SRS subframe and the HARQ-ACK/SR transmitted in the subframe except the cell-specific SRS subframe and then perform final decoding.

4.5 Method for Using DM-RS

In the above-mentioned embodiments of the present invention, it may be configured that DM-RS in a different subframe is used to improve performance of channel estimation with respect to UL data transmitted through PUSCH.

To this end, it is preferable that the DM-RS in the different subframe is configured to have the same frequency band and the same sequence, similar to a method of configuring parameters for repeated SRS transmission. That is, it is preferred that an eNB transmits to a UE a higher layer parameter indicating whether the DM-RS in the different subframe is used for channel estimation.

For instance, the eNB may transmit to an MTC UE information indicating a specific subframe of which DM-RS is used together with repeated SRS transmission to estimate an uplink channel.

Hereinafter, a description will be given of a method of setting a u value of a DM-RS sequence.

The eNB can deactivate group hopping for determining u of PUSCH DM-RS used for uplink channel estimation together with the repeated SRS transmission. This is because to have the same DM-RS sequence during repeated transmission of the PUSCH DM-RS. Alternatively, the eNB may set the u value of the PUSCH DM-RS to be maintained as the same value in a first subframe set and to have a different value in a second subframe set. The u value of the DM-RS can be represented as Equation 6 below.

$$u=(f_{gh}(n_p^{DMRS})+f_{ss}) \bmod 30 \qquad \text{[Equation 6]}$$

In [Equation 6], $n_p^{DMRS}$ is a parameter indicating the number of subframes in which UL channel estimation is performed by using the DM-RS, $f_{ss}=f_{ss}^{PU\ SCH}S=(f_{ss}^{PU\ CCH}+\Delta_{ss})$, and $\Delta_{ss} \in \{0, 1, \ldots, 29\}$. In this case, if DM-RSs of p consecutive subframes are used, $n_p^{DMRS}$ may mean a parameter for assigning a new random value to each of the p subframes.

Hereinafter, a description will be given of a method of setting a v value of a DM-RS sequence. If a DM-RS transmission band is equal to or less than 6 RB, it is preferred to set the v value to '0' in the same manner as the conventional one. If the DM-RS transmission band is equal to or greater than 6 RB, it is preferred to set the v value to '0' by deactivating sequence hopping.

Alternatively, similar to sequence group hopping, sequence hopping may be configured to have the same v value in a subframe set where channel estimation is performed using the DM-RS and have a different v value in a next transmission interval. In this case, the v value may be set to a random value resulting from a function of the parameter $n_p^{DMRS}$ indicating the number of subframes in which the channel estimation is performed using the DM-RS. That is, each subframe set in which the channel estimation is performed using the DM-RS may be configured to have a different v value.

5. Method for Transmitting PUSCH and SRS by MTC UE 5.1 SRS Transmission Method in Case of Frequency Hopping During transmission of UL data on a PUSCH, an MTC UE may be configured to perform frequency hopping or switch a PUSCH transmission subband. The resulting increase of a diversity gain may reduce the number of repeated PUSCH transmissions for an MTC UE in a Coverage Enhancement (CE) mode, and may offer a performance gain for an MTC UE in a Low Cost (LC) mode.

Figure 13:
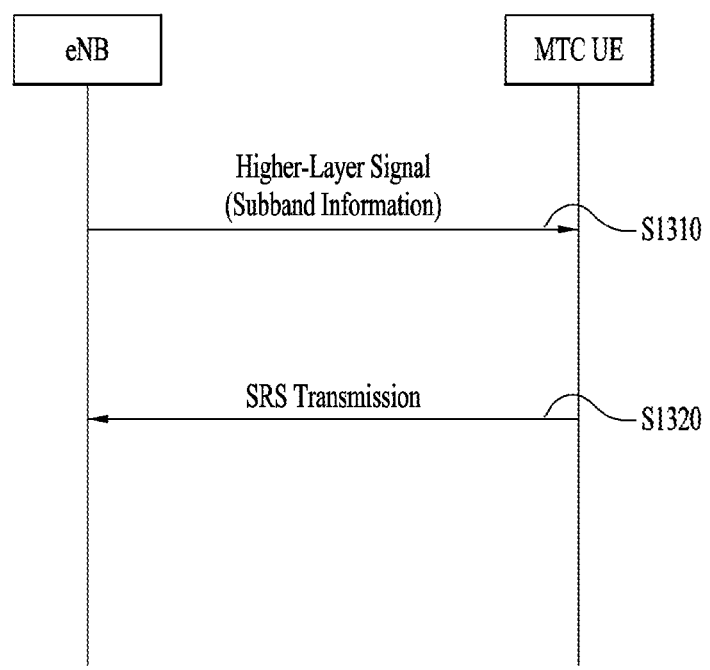
FIG. 13 is a view illustrating one of SRS transmission methods in the case of frequency hopping.

FIG. 13 is a view illustrating one of SRS transmission methods in the case of frequency hopping.

An MTC UE preferably transmits an SRS in a subband to which PUSCH frequency hopping or frequency switching is performed so that an eNB may determine an MCS for a PUSCH.

The eNB may transmit, to the MTC UE, subband information indicating the subband to which frequency hopping or switching is performed, semi-statically by higher-layer signaling such as RRC signaling, to thereby configure the subband (S1310).

The MTC UE may be aware of the subband to which the PUSCH is hopped or switched based on the subband information. Accordingly, the MTC UE may transmit the PUSCH and the SRS in the subband. For an SRS transmission scheme, refer to the descriptions of FIGS. 9 to 12 (S1320).

An SRS transmission band may be configured in various manners. According to the current 3GPP LTE standard specifications, 4 PRBs are a minimum unit for a SRS transmission. For a CE-mode MTC UE, however, transmission of an SRS in one PRB brings about a power boosting effect, relative to transmission of an SRS in 4 PRBs, thereby improving channel estimation performance. Thus, the MTC UE may be configured to transmit an SRS in units of one PRB.

An LC-mode MTC UE may transmit an SRS sequentially in subbands configured by a higher layer at SRS transmission time points. Particularly, if the CE-mode MTC UE is configured to transmit an SRS in the same subband at X SRS transmission time points and then transmit the SRS X times again in the next subband, the repeated SRS transmissions may lead to improved channel estimation performance.

For an FDD LC-mode UE, if the number of subbands is M (M>2) and a UE-specific SRS transmission period is set to be longer than 2 ms, a subband carrying an SRS, $srs_b(n)$ (n is a subband index (0, 1, . . . , n)) may be represented as the following equation.

$$srs_b(n) = n \bmod M, \qquad \text{[Equation 7]}$$
$$n = \left\lfloor \frac{\left(10 \cdot n_f + \left\lfloor \frac{n_s}{2} \right\rfloor\right)}{T_{SRS}} \right\rfloor$$

In [Equation 7], $n_f$ is a system frame number, $n_s$ is a slot number, and $T_{SRS}$ is a UE-specific SRS transmission period.

In the case where the CE-mode MTC UE transmits an SRS X times in the same subband and then switches the SRS transmission subband, the SRS transmission subband $srs_b(n)$ may be represented as the following equation.

$$srs_b(n) = n \bmod M, \qquad \text{[Equation 8]}$$
$$n = \left\lfloor \frac{\left(10 \cdot n_f + \left\lfloor \frac{n_s}{2} \right\rfloor\right)}{X \cdot T_{SRS}} \right\rfloor$$

In the SRS transmission methods described by [Equation 7] and [Equation 8], it may occur that an SRS transmission is dropped and thus an SRS is not transmitted due to simultaneous transmission of the SRS and another UL channel. In this case, the MTC UE may not transmit the SRS in a corresponding subband at a corresponding time point. Then, the MTC UE may transmit the SRS in a subband determined by [Equation 7] or [Equation 8] at a next transmission time point.

5.2 Method for Controlling SRS Transmission by MTC UE

In an MTC mode supporting a frequency hopping, an SRS transmission period may be set to 2 ms or longer. That is, the MTC UE may be configured not to expect the SRS transmission period to be 1 ms. This implies that an SRS is not transmitted repeatedly in successive subframes.

It is because the MTC UE is capable of transmitting and receiving a radio channel only in a limited bandwidth (e.g., 6 PRBs) and thus if a transmission or reception subband is changed, the MTC UE needs a frequency retuning time. Therefore, if the MTC UE is configured to transmit an SRS in successive subframes, throughput loss may occur due to a time gap caused by the frequency retuning time.

For example, in the case where the MTC UE transmits a PUSCH and/or a PUCCH repeatedly in successive subframes, subframe n and subframe n+1, a subband carrying the PUSCH and/or the PUCCH may not be identical to a subband carrying the SRS and thus frequency retuning is needed. Thus, the MTC UE may be configured to transmit only the PUSCH and/or the PUCCH, and drop the SRS supposed to be transmitted in subframe n or subframe n+1.

Figure 14:
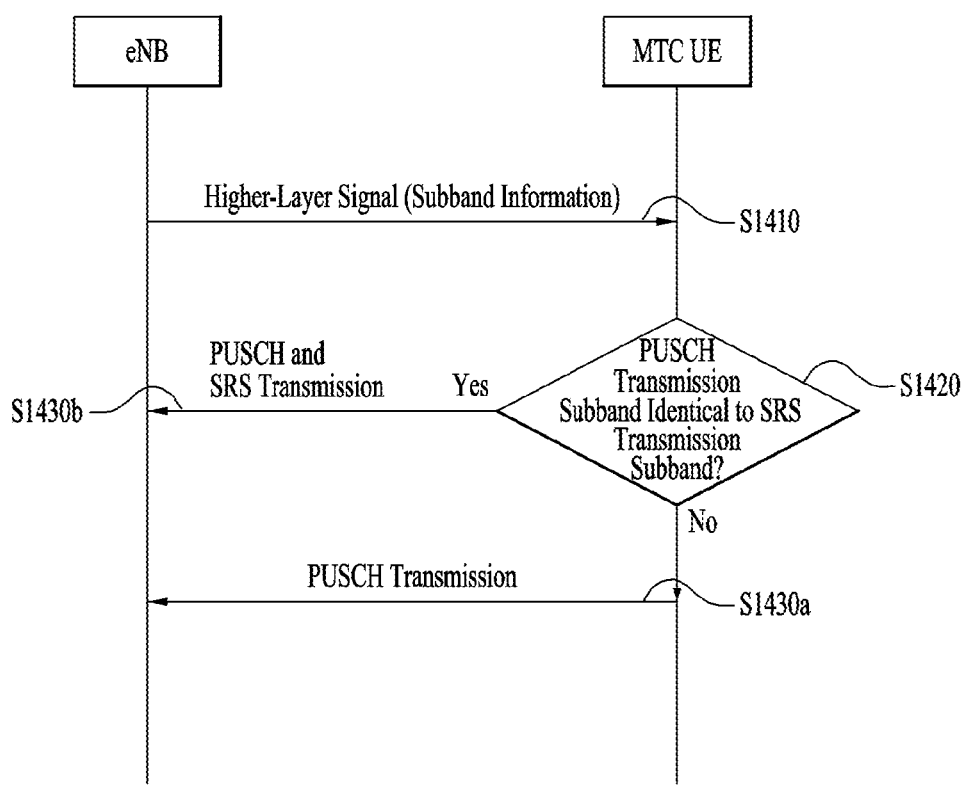
FIG. 14 is a view illustrating a method for controlling an SRS transmission, in the case where an uplink transmission subband is not identical to an SRS transmission subband.

FIG. 14 is a view illustrating a method for controlling an SRS transmission, in the case where a UL transmission subband is not identical to an SRS transmission subband.

In the case where a PUSCH is transmitted at an SRS transmission time point in the MTC system supporting the frequency hopping, if a PUSCH transmission subband is not identical to an SRS transmission subband, an SRS is preferably not transmitted. This is because if a frequency retuning time is secured, a time for SRS transmission may be insufficient. This will be described in detail with reference to FIG. 14.

An eNB may transmit a higher-layer signal including an SRS transmission parameter for an SRS transmission to an MTC UE (S1410).

If frequency hopping or subband switching is applied to the MTC UE, subband information indicating a subband in which to transmit an SRS may further be transmitted in step S1410.

If the MTC UE supporting frequency hopping has a PUSCH to be transmitted at an SRS transmission time point (in either of the periodic SRS transmission scheme or the triggered SRS transmission scheme), the MTC UE may determine whether the SRS transmission subband is identical to a PUSCH transmission subband (S1420).

If the SRS transmission subband is not identical to the PUSCH transmission subband, the MTC UE is configured to drop the SRS so as not to transmit the SRS. This is because if a frequency retuning time is secured to overcome the subband mismatch, a time for the SRS transmission may be insufficient. Accordingly, the MTC UE may drop the SRS transmission and transmit only the PUSCH. Further, PUSCH data may be transmitted in an SC-FDMA symbol in which the SRS is supposed to be transmitted (S1430a).

If the PUSCH transmission subband is identical to the SRS transmission subband in step S1420, the MTC UE may transmit the PUSCH and the SRS in the corresponding subband of a corresponding subframe (S1430b).

In another aspect of the present disclosure, if a PUSCH is transmitted in successive subframes, it is preferred not to transmit an SRS in the successive subframes. However, if the subband size of an SRS transmission subframe (SF n) is different from that of a PUSCH transmission subframe (SF n+1), the SRS transmission is preferably dropped. This is done to secure a frequency retuning time for a limited bandwidth and prevent data throughput loss.

In the above-described embodiments of the present disclosure, a subband may be referred to as a narrow band. In addition, a channel in which an MTC UE transmits and receives data or transmits an SRS may be configured in a narrow band.

6. Apparatuses

Apparatuses illustrated in FIG. 15 are means that can implement the methods described before with reference to FIGS. 1 to 14.

A UE may act as a transmitter on a UL and as a receiver on a DL. An eNB may act as a receiver on a UL and as a transmitter on a DL.

That is, each of the UE and the eNB may include a Transmission (Tx) module 1540 or 1550 and a Reception (Rx) module 1560 or 1570, for controlling transmission and reception of information, data, and/or messages, and an antenna 1500 or 1510 for transmitting and receiving information, data, and/or messages.

Each of the UE and the eNB may further include a processor 1520 or 1530 for implementing the afore-described embodiments of the present disclosure and a memory 1580 or 1590 for temporarily or permanently storing operations of the processor 1520 or 1530.

The UE described with reference to FIG. 15 may be an MTC UE, and the NB described with reference to FIG. 15 supports MTC. The embodiments of the present disclosure may be implemented by the components and functions of the above-described UE and eNB. For example, the processor of the MTC UE may drop or transmit an SRS depending on match or mismatch between a PUSCH transmission subband and an MTC SRS transmission subband. The processor of the eNB may transmit SRS configuration information and/or subband information to the MTC UE by higher-layer signaling, so that the MTC UE may transmit an SRS generated based on the SRS configuration information in a subband indicated by the subband information. For details, refer to Section 1 to Section 5.

The Tx and Rx modules of the UE and the eNB may perform a packet modulation/demodulation function for data transmission, a high-speed packet channel coding function. OFDMA packet scheduling, TDD packet scheduling, and/or channelization. Each of the UE and the eNB of FIG. 15 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1380 or 1390 and executed by the processor 1320 or 1330. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for controlling a Sounding Reference Signal (SRS) transmission in a wireless access system supporting a Machine Type Communication (MTC), the method is performed by an MTC User Equipment (MTC UE) and comprising:
    receiving a higher-layer signal including information about an SRS to be transmitted;
    configuring the SRS based on the information about the SRS;
    transmitting a Physical Uplink Shared Channel (PUSCH) repeatedly in a subframe of index n and a subframe of index n+1 on a configured PUSCH subband; and
    transmitting the SRS on a configured SRS subband in the subframe of index n based on the configured SRS subband being identical to the configured PUSCH subband in a frequency domain.

2. The method according to claim 1, wherein the higher-layer signal further includes subband information indicating the SRS subband in which the SRS is to be transmitted.

3. The method according to claim 1, wherein the SRS is transmitted sequentially in units of one physical resource block (PRB).

4. The method according to claim 1, wherein the SRS is repeatedly transmitted a predetermined number of times.

5. The method according to claim 1, wherein the SRS in the subframe of index n is not transmitted based on the configured SRS subband being different from the configured PUSCH subband in the frequency domain.

6. A Machine Type Communication (MTC) User Equipment (UE) for controlling a Sounding Reference Signal (SRS) transmission in a wireless access system supporting an MTC, the MTC UE comprising:

a transmitter;

a receiver; and a processor, operatively coupled to the transmitter and the receiver, wherein the processor:

controls the receiver to receive a higher-layer signal including information about an SRS to be transmitted, configures the SRS based on the information about the SRS, controls the transmitter to transmit a Physical Uplink Shared Channel (PUSCH) repeatedly in a subframe of index n and a subframe of index n+1 on a configured PUSCH band, and controls the transmitter to transmit the SRS on a configured SRS subband in the subframe of index n based on the configured SRS subband being identical to the configured PUSCH subband in a frequency domain.

7. The MTC UE according to claim 6, wherein the higher-layer signal further includes subband information indicating the SRS subband in which the SRS is to be transmitted.

8. The MTC UE according to claim 6, wherein the SRS is transmitted sequentially in units of one physical resource block (PRB).

9. The MTC UE according to claim 6, wherein the SRS is repeatedly transmitted a predetermined number of times.

10. The MTC UE according to claim 6, wherein the SRS in the subframe of index n is not transmitted based on the configured SRS subband being different from the configured PUSCH subband in the frequency domain.

* * * * *